United States Patent
Yamano et al.

(10) Patent No.: US 10,186,727 B2
(45) Date of Patent: Jan. 22, 2019

(54) FUEL CELL STACK

(71) Applicant: HONDA MOTOR CO., LTD., Tokyo (JP)

(72) Inventors: Naoki Yamano, Wako (JP); Yuta Ikeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 80 days.

(21) Appl. No.: 15/445,984

(22) Filed: Mar. 1, 2017

(65) Prior Publication Data
US 2017/0256813 A1  Sep. 7, 2017

(30) Foreign Application Priority Data
Mar. 1, 2016 (JP) ................................. 2016-038960

(51) Int. Cl.
| | | |
|---|---|---|
| *H01M 8/24* | (2016.01) | |
| *H01M 8/248* | (2016.01) | |
| *H01M 8/0297* | (2016.01) | |
| *H01M 8/2483* | (2016.01) | |
| *H01M 8/241* | (2016.01) | |

(52) U.S. Cl.
CPC ......... *H01M 8/248* (2013.01); *H01M 8/0297* (2013.01); *H01M 8/241* (2013.01); *H01M 8/2483* (2016.02)

(58) Field of Classification Search
None
See application file for complete search history.

(56) References Cited

U.S. PATENT DOCUMENTS

| | | | | |
|---|---|---|---|---|
| 5,176,966 A | * | 1/1993 | Epp ..................... | H01M 8/0271 429/438 |
| 5,284,718 A | * | 2/1994 | Chow ................. | H01M 8/0271 429/438 |
| 2002/0022170 A1 | * | 2/2002 | Franklin ................ | H01M 2/08 429/457 |
| 2002/0022382 A1 | * | 2/2002 | Franklin ................ | H01M 2/08 439/66 |
| 2002/0132151 A1 | * | 9/2002 | Choi .................. | H01M 8/0247 429/457 |
| 2004/0053099 A1 | * | 3/2004 | Franklin ................ | H01M 2/08 429/437 |

(Continued)

FOREIGN PATENT DOCUMENTS

JP        09-134734        5/1997

*Primary Examiner* — Scott J. Chmielecki
(74) *Attorney, Agent, or Firm* — Mori & Ward, LLP (57) ABSTRACT

A fuel cell stack includes a first knock pin and a second knock pin. A separator has an outer peripheral shape having first and second short sides. The separator has a first knock pin insertion hole adjacent to the first side and a second knock pin insertion hole adjacent to the second side. The first and second knock pin insertion holes have a circular shape. The first insulating plate has third and fourth knock pin insertion holes. The second insulating plate has fifth and sixth knock pin insertion holes. The first knock pin is inserted into the third and fifth knock pin insertion holes to be movable in the third and fifth knock pin insertion holes. The second knock pin is inserted into the fourth and sixth knock pin insertion holes to be movable in the fourth and sixth knock pin insertion holes.

10 Claims, 4 Drawing Sheets

(56) References Cited

U.S. PATENT DOCUMENTS

| | | | | |
|---|---|---|---|---|
| 2004/0106033 | A1* | 6/2004 | Kato | H01M 8/02 |
| | | | | 429/458 |
| 2004/0217587 | A1* | 11/2004 | Gervasio | H01M 8/0247 |
| | | | | 285/125.1 |
| 2005/0249995 | A1* | 11/2005 | Sugiura | H01M 8/0206 |
| | | | | 429/468 |
| 2006/0115703 | A1* | 6/2006 | Kubota | H01M 8/0221 |
| | | | | 429/483 |
| 2006/0183014 | A1* | 8/2006 | Levandoski | H01M 8/0278 |
| | | | | 429/463 |
| 2008/0138667 | A1* | 6/2008 | Lewinski | H01M 8/04029 |
| | | | | 429/437 |
| 2008/0138670 | A1* | 6/2008 | Johnston | H01M 8/0258 |
| | | | | 429/434 |
| 2008/0280178 | A1* | 11/2008 | Spink | H01M 8/0236 |
| | | | | 429/514 |
| 2008/0305368 | A1* | 12/2008 | Takahashi | H01M 8/0297 |
| | | | | 429/437 |
| 2009/0181269 | A1* | 7/2009 | Unoki | H01M 8/0263 |
| | | | | 429/433 |
| 2015/0380744 | A1* | 12/2015 | Komatsu | H01M 8/2425 |
| | | | | 429/444 |
| 2016/0336605 | A1* | 11/2016 | Tanimura | H01M 8/242 |
| 2016/0372778 | A1* | 12/2016 | Hotta | H01M 8/2432 |
| 2017/0352894 | A1* | 12/2017 | Kanno | H01M 8/18 |

* cited by examiner

FUEL CELL STACK

CROSS-REFERENCE TO RELATED APPLICATIONS

The present application claims priority under 35 U. S. C. § 119 to Japanese Patent Application No. 2016-038960, filed Mar. 1, 2016. The contents of this application are incorporated herein by reference in their entirety.

BACKGROUND OF THE INVENTION

Field of the Invention

The present invention relates to a fuel cell stack.

Discussion of the Background

For example, a solid polymer-type fuel cell has an electrolyte film/electrode structure (MEA) in which an anode electrode is arranged on one surface of an electrolyte film including a polymer ion exchange membrane, and a cathode electrode is arranged on the other surface. A power generation cell (unit cell) is configured when the electrolyte film/electrode structure is put between separators. Normally, when a predetermined number of power generation cells are stacked, for example, the power generation cells are incorporated as an on-board fuel cell stack in a fuel cell vehicle (fuel cell electric vehicle, etc.).

In a fuel cell stack, a lot of power generation cells are stacked, and the power generation cells need to be accurately positioned with respect to each other in order to ensure desired sealing as the whole fuel cell stack.

In this regard, for example, there is a known method of assembling a fuel cell disclosed in Japanese Laid-open Patent Publication No. H9-134734. In this assembly method, a positioning hole for cell assembly is drilled in a pressure plate for pressing a stack, and a knock pin is inserted into the positioning hole for cell assembly in an erect posture. Subsequently, the knock pin is successively fit to cell positioning holes drilled in respective flat plate components, thereby configuring the cell.

Further, when the above-described operation is repeated, a predetermined number of power generation cells are stacked, and a stack is configured. Thereafter, when tightening and fixing are performed using a pressurization plate, the fuel cell is assembled.

For this reason, the flat plate components included in the fuel cell may be stacked without position shift to configure the power generation cells, and the power generation cells may be stacked without position shift and sealed at high accuracy.

SUMMARY

According to one aspect of the present invention, a fuel cell stack includes a power generation cell in which an electrolyte film/electrode structure provided with electrodes on both surfaces of an electrolyte film and a separator are stacked, an insulating plate and an end plate being arranged at both ends of a stacked body, which is obtained by stacking a plurality of power generation cells, in a stacking direction. The separator and the insulating plate have rectangular shapes, and are positioned with respect to each other by knock pins integrally inserted thereto. First knock pin insertion holes has circular opening shapes formed at short sides of the separator facing each other. The knock pins are inserted into the first knock pin insertion holes. Second knock pin insertion holes have ellipse opening shapes and having elongated shapes in a long-side direction of the insulating plate are formed at short sides of the insulating plate facing each other. The knock pins are inserted into the second knock pin insertion holes.

According to another aspect of the present invention, a fuel cell stack includes a stacked body, a first knock pin, a second knock pin, and a second insulating plate. The stacked body has a first end and a second end opposite to the first end in a stacking direction. The stacked body includes power generation cells stacked in the stacking direction. Each of the power generation cells includes an electrolyte film/electrode structure and a separator. The electrolyte film/electrode structure includes an electrolyte film sandwiched between a first electrode and a second electrode in the stacking direction. The separator is stacked on the electrolyte film/electrode structure in the stacking direction. The separator has an outer peripheral shape viewed in the stacking direction. The outer peripheral shape includes a first short side, a second short side opposite to the first short side, and long sides opposite to each other and longer than the first and second short sides. The separator has a first knock pin insertion hole adjacent to the first side and a second knock pin insertion hole adjacent to the second side. Each of the first knock pin insertion hole and the second knock pin insertion hole has a circular shape. The first knock pin is inserted into the first knock pin insertion hole. The second knock pin is inserted into the second knock pin insertion hole. The first insulating plate is provided at the first end. The first insulating plate has a third knock pin insertion hole provided to correspond to the first knock pin insertion hole and a fourth knock pin insertion hole provided to correspond to the second knock pin insertion hole. The second insulating plate is provided at the second end. The second insulating plate has a fifth knock pin insertion hole provided to correspond to the first and third knock pin insertion holes, and a sixth knock pin insertion hole provided to correspond to the second and fourth knock pin insertion holes. The first knock pin is inserted into the third and fifth knock pin insertion holes to be movable in the third and fifth knock pin insertion holes. The second knock pin is inserted into the fourth and sixth knock pin insertion holes to be movable in the fourth and sixth knock pin insertion holes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
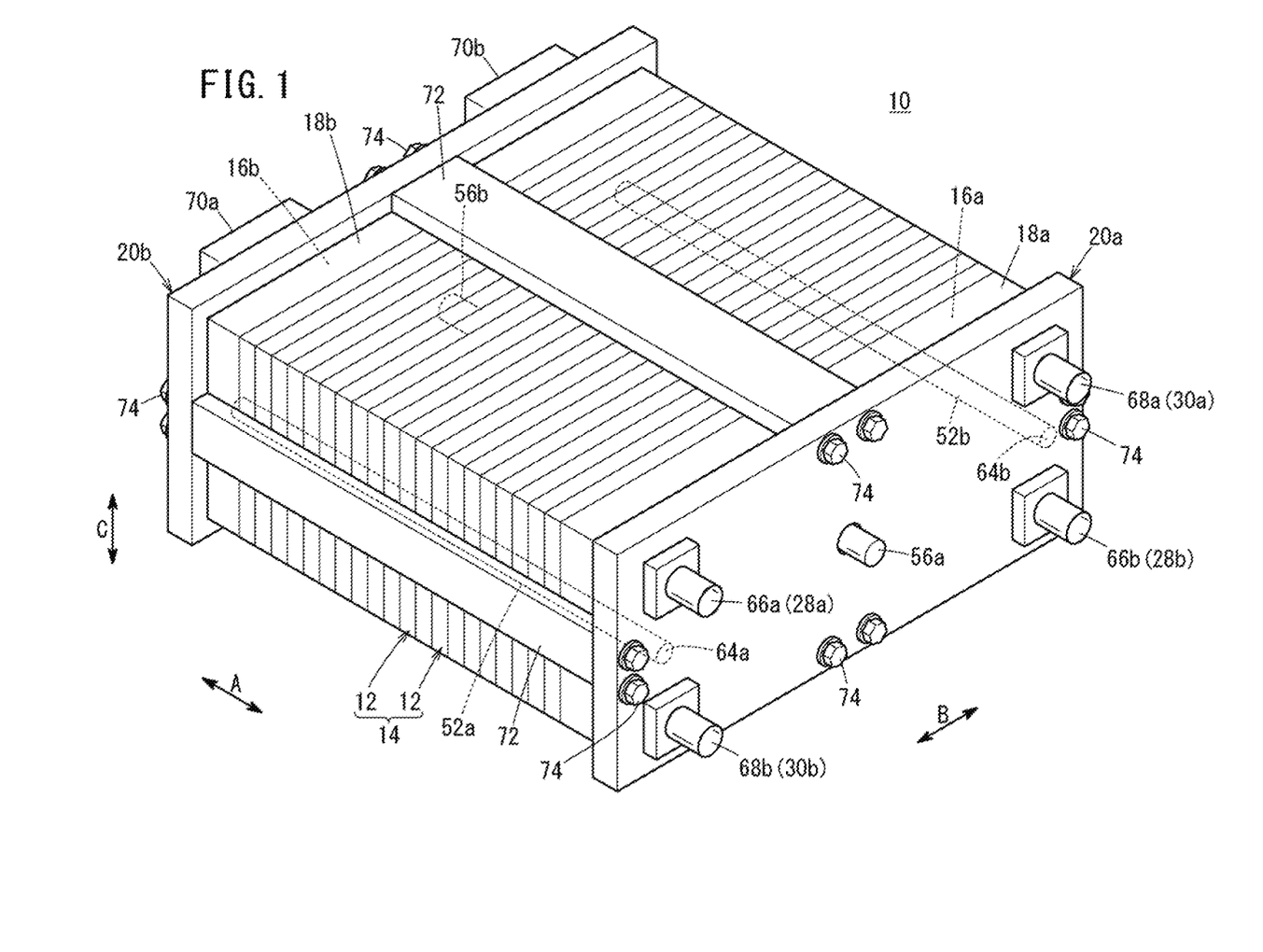
FIG. 1 is a perspective view for description of a fuel cell stack according to an embodiment of the present invention viewed from a first end plate side.
Figure 2:
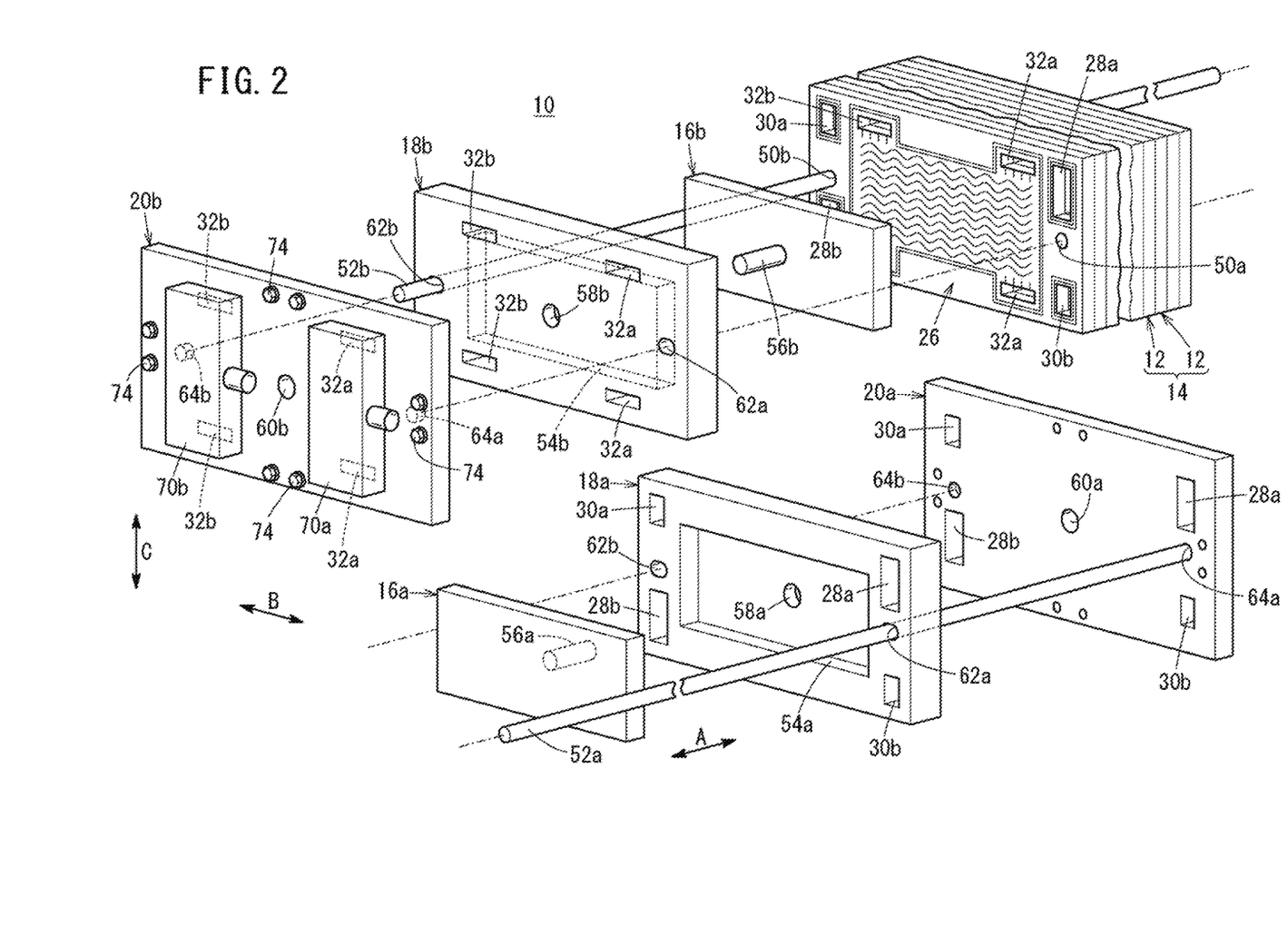
FIG. 2 is a partial exploded perspective view for description of the fuel cell stack.

As illustrated in FIG. 1 and FIG. 2, for example, a fuel cell stack 10 according to an embodiment of the present invention is an on-board fuel cell stack loaded in a fuel cell electric vehicle (fuel cell vehicle) (not illustrated).

The fuel cell stack 10 includes a stacked body 14 in which a plurality of power generation cells 12 is stacked in a horizontal direction (direction of an arrow A) with an electrode surface in a standing posture. In the fuel cell stack 10, the plurality of power generation cells 12 may be stacked in a gravity direction (direction of an arrow C).

A first terminal plate 16a, a first insulating plate 18a, and a first end plate 20a are successively arranged outward at one end of the power generation cells 12 in a stacking direction (one end of the stacked body 14). A second terminal plate 16b, a second insulating plate 18b, and a second end plate 20b are successively arranged outward at the other end of the power generation cells 12 in the stacking direction (the other end of the stacked body 14).

The first insulating plate 18a and the second insulating plate 18b are made of a resin material having an insulating property. The first end plate 20a and the second end plate 20b are made of a metal material.

Figure 3:
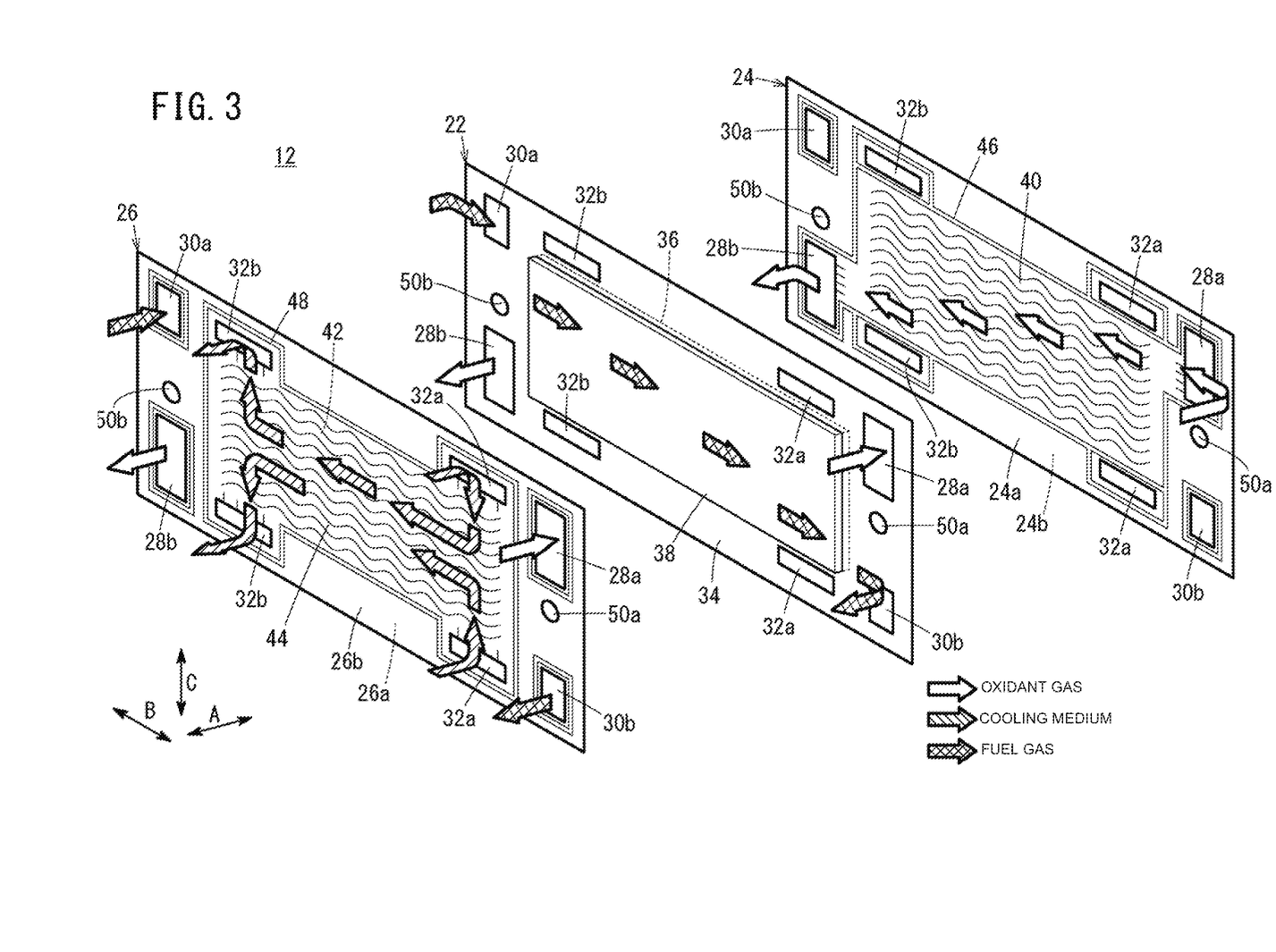
FIG. 3 is an exploded perspective view for description of a main part of a power generation cell included in the fuel cell stack.

As illustrated in FIG. 3, the power generation cell 12 has a rectangular shape elongated in a direction of an arrow B. The power generation cell 12 includes an electrolyte film/electrode structure 22 and a cathode separator 24 and an anode separator 26 which put the electrolyte film/electrode structure 22 therebetween. The cathode separator 24 and the anode separator 26 have a horizontally long (or vertically long) rectangular shape.

For example, the cathode separator 24 and the anode separator 26 include a steel plate, a stainless steel plate, an aluminum plate, a plated steed plate, or a metal plate obtained by performing a surface treatment for corrosion protection on a metal surface thereof. Referring to the cathode separator 24 and the anode separator 26, a plane has a rectangular shape, and a cross section is formed in an uneven shape by performing pressing on a thin metal plate in a shape of a wave.

Oxidant gas supply communication holes 28a and fuel gas discharge communication holes 30b are provided to separately communicate with one another in a direction of an arrow A corresponding to a stacking direction at one end edge portion of the power generation cell 12 in a long-side direction (direction of an arrow B). The oxidant gas supply communication holes 28a supply oxidant gas, for example, oxygen containing gas, and the fuel gas discharge communication holes 30b supply fuel gas, for example, hydrogen-containing gas.

Fuel gas supply communication holes 30a for supplying fuel gas and oxidant gas discharge communication holes 28b for discharging oxidant gas are provided to separately communicate with one another in the direction of the arrow A corresponding to the stacking direction at the other end edge portion of the power generation cell 12 in the long-side direction.

Cooling medium supply communication holes 32a are provided at tops and bottoms at one side of both end edge portions of the power generation cell 12 in a short-side direction (direction of an arrow C) (one end side in a horizontal direction), that is, at a side of the oxidant gas supply communication holes 28a and the fuel gas discharge communication holes 30b. The cooling medium supply communication holes 32a separately communicate with one another in the direction of the arrow A to supply a cooling medium, and one (or two) cooling medium supply communication hole is provided at each of a top and a bottom at sides facing each other.

Cooling medium discharge communication holes 32b are provided at tops and bottoms at the other side of the both end edge portions of the power generation cell 12 in the short-side direction (the other end side in the horizontal direction), that is, at a side of the fuel gas supply communication holes 30a and the oxidant gas discharge communication holes 28b. The cooling medium discharge communication holes 32b separately communicate with one another in the direction of the arrow A to discharge the cooling medium, and one (or two) cooling medium discharge communication hole is provided at each of a top and a bottom at sides facing each other.

For example, the electrolyte film/electrode structure 22 includes a solid polymer electrolyte film 34 corresponding to a thin film of perfluorosulfonic acid containing water, and a cathode electrode 36 and an anode electrode 38 which put the solid polymer electrolyte film 34 therebetween. The solid polymer electrolyte film 34 is a cation exchange membrane, and an HC (hydrocarbon)-based electrolyte may be used in addition to a fluorine-based electrolyte.

The cathode electrode 36 and the anode electrode 38 have a gas diffusion layer (not illustrated) including carbon paper, etc. An electrode catalyst layer (not illustrated) is formed when porous carbon particles on which a platinum alloy is supported are equally applied to a surface of the gas diffusion layer. The electrode catalyst layer is formed on both surfaces of the solid polymer electrolyte film 34.

An oxidant gas passage 40 that allows communication between the oxidant gas supply communication hole 28a and the oxidant gas discharge communication hole 28b is formed on a surface 24a of the cathode separator 24 facing the electrolyte film/electrode structure 22. The oxidant gas passage 40 is formed by a plurality of wavelike passage grooves (or linear passage grooves) extending in the direction of the arrow A.

A fuel gas passage 42 that allows communication between the fuel gas supply communication hole 30a and the fuel gas discharge communication hole 30b is formed on a surface 26a of the anode separator 26 facing the electrolyte film/electrode structure 22. The fuel gas passage 42 is formed by a plurality of wavelike passage grooves (or linear passage grooves) extending in the direction of the arrow A.

A cooling medium passage 44 that allows communication between the cooling medium supply communication holes 32a and 32a and the cooling medium discharge communication holes 32b and 32b is formed between a surface 26b of the anode separator 26 and a surface 24b of the cathode separator 24 adjacent to each other. The cooling medium passage 44 extends in the horizontal direction, and circulates the cooling medium over an electrode range of the electrolyte film/electrode structure 22.

A first seal member 46 is integrally formed by surrounding an outer peripheral edge portion of the cathode separator 24 on the surfaces 24a and 24b of the cathode separator 24. A second seal member 48 is integrally formed by surrounding an outer peripheral edge portion of the anode separator 26 on the surfaces 26a and 26b of the anode separator 26.

For example, a seal member having elasticity of a seal material such as EPDM, NBR, fluorocarbon rubber, silicone rubber, fluorosilicone rubber, butyl rubber, natural rubber, styrene rubber, chloroprene rubber, or acrylic rubber, a cushion material, a packing material, etc. is used as the first seal member 46 and the second seal member 48.

First knock pin insertion holes 50a and 50b having circular opening shapes are formed at short sides of the power generation cell 12 facing each other. The first knock pin insertion hole 50a is disposed between the oxidant gas supply communication hole 28a and the fuel gas discharge communication hole 30b at one short side. The first knock pin insertion hole 50b is disposed between the fuel gas supply communication hole 30a and the oxidant gas discharge communication hole 28b at the other short side.

Knock pins 52a and 52b having circular cross sections are fit to the first knock pin insertion holes 50a and 50b, and the knock pins are disposed by integrally penetrating between the first end plate 20a and the second end plate 20b (see FIG. 1 and FIG. 2).

As illustrated in FIG. 2, the first terminal plate 16a, the second terminal plate 16b, the first insulating plate 18a, the second insulating plate 18b, the first endplate 20a, and the second end plate 20b having rectangular shapes elongated in the direction of the arrow B. A recess 54a that accommodates the first terminal plate 16a is formed in a central portion of the first insulating plate 18a, and a recess 54b that accommodates the second terminal plate 16b is formed in a central portion of the second insulating plate 18b.

A first power output terminal 56a extends outward from a substantially central portion of the first terminal plate 16a (a center thereof may be deviated from the central portion). The first power output terminal 56a extends to an outside of the first end plate 20a by penetrating a hole portion 58a formed in the first insulating plate 18a and a hole portion 60a formed in the first end plate 20a.

A second power output terminal 56b extends outward from a substantially central portion of the second terminal plate 16b (a center thereof may be deviated from the central portion). The second power output terminal 56b extends to an outside of the second endplate 20b by penetrating a hole portion 58b formed in the second insulating plate 18b and a hole portion 60b formed in the second end plate 20b.

The oxidant gas supply communication holes 28a, the fuel gas discharge communication holes 30b, the fuel gas supply communication holes 30a, and the oxidant gas discharge communication holes 28b are formed in the first insulating plate 18a and the first end plate 20a. A pair of cooling medium supply communication holes 32a and a pair of cooling medium discharge communication holes 32b are formed in the second insulating plate 18b and the second end plate 20b.

Figure 4:
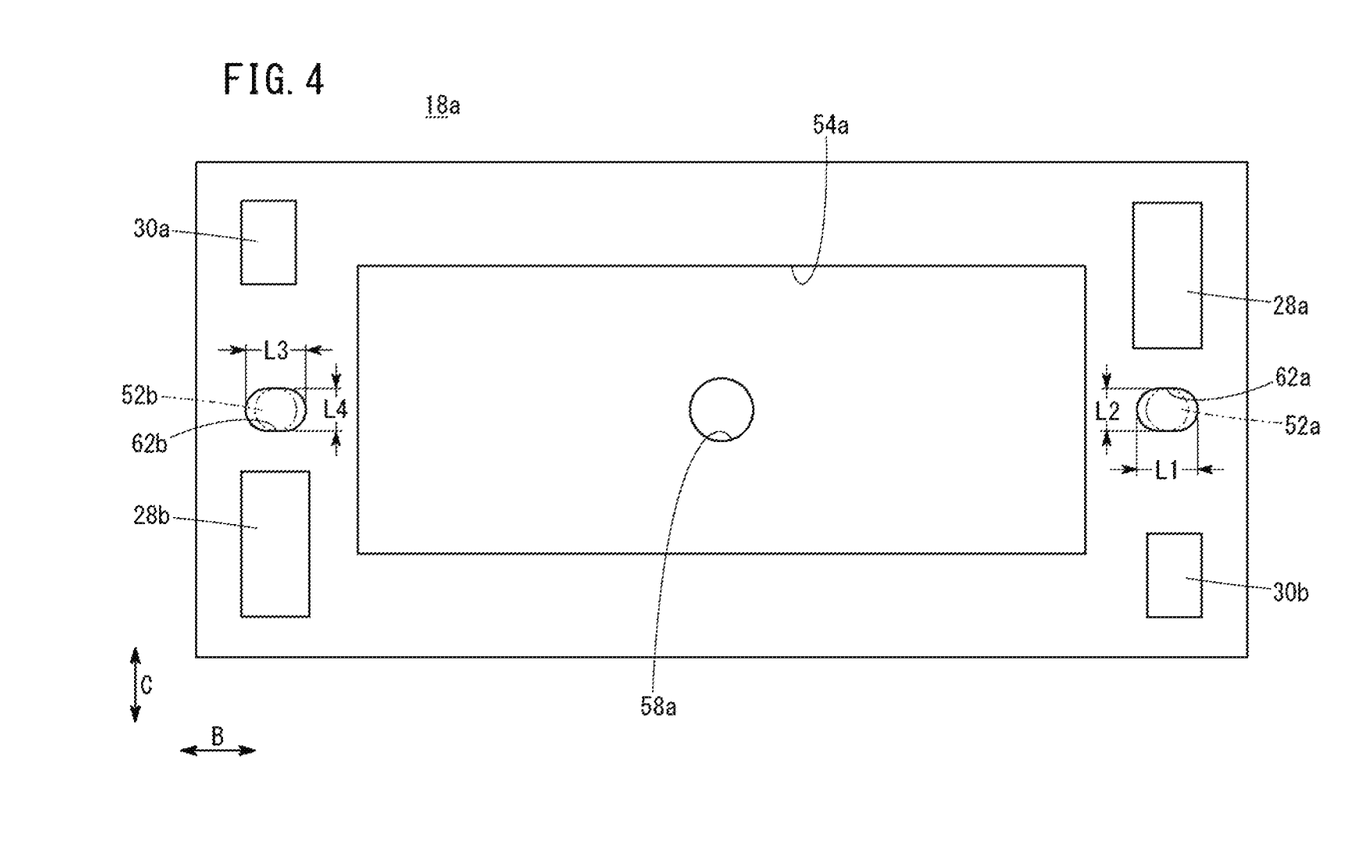
FIG. 4 is a front view for description of a first insulating plate included in the fuel cell stack.

As illustrated in FIG. 2 and FIG. 4, a second knock pin insertion hole 62a positioned between the oxidant gas supply communication hole 28a and the fuel gas discharge communication hole 30b is formed at one short side of the first insulating plate 18a. The second knock pin insertion hole 62a has an ellipse opening shape.

As illustrated in FIG. 4, referring to the second knock pin insertion hole 62a, a dimension L1 in a long-side direction of the first insulating plate 18a (direction of an arrow B) is set to be longer than a dimension L2 in a short-side direction of the first insulating plate 18a (direction of an arrow C) (L1>L2). The dimension L2 corresponding to a diameter of an ellipse is preferably set to the same dimension as a diameter of the knock pin 52a.

As illustrated in FIG. 2 and FIG. 4, a second knock pin insertion hole 62b positioned between the fuel gas supply communication hole 30a and the oxidant gas discharge communication hole 28b is formed at the other short side of the first insulating plate 18a. The second knock pin insertion hole 62b has an ellipse opening shape.

As illustrated in FIG. 4, referring to the second knock pin insertion hole 62b, a dimension L3 in the long-side direction of the first insulating plate 18a (direction of the arrow B) is set to be longer than a dimension L4 in the short-side direction of the first insulating plate 18a (direction of the arrow C) (L3>L4). The dimension L4 corresponding to a diameter of an ellipse is preferably set to the same dimension as a diameter of the knock pin 52b. In addition, only at least one of the second knock pin insertion holes 62a and 62b may be set to an ellipse opening shape, and the other one may be set to a circular opening shape.

As illustrated in FIG. 2, the second knock pin insertion hole 62a positioned between the oxidant gas supply communication hole 28a and the fuel gas discharge communication hole 30b is formed at one short side of the second insulating plate 18b. The second knock pin insertion hole 62b positioned between the fuel gas supply communication hole 30a and the oxidant gas discharge communication hole 28b is formed at the other short side of the second insulating plate 18b. The second knock pin insertion holes 62a and 62b are configured similarly to the second knock pin insertion holes 62a and 62b provided in the first insulating plate 18a. Further, the same reference symbol will be assigned to the same component, and a detailed description thereof will be omitted.

A knock pin fitting hole 64a positioned between the oxidant gas supply communication hole 28a and the fuel gas discharge communication hole 30b is formed at one short side of the first endplate 20a up to a predetermined depth (or to penetrate the plate). The knock pin fitting hole 64a has a circular opening shape, and an end portion of the knock pin 52a is fit thereto.

A knock pin fitting hole 64b positioned between the fuel gas supply communication hole 30a and the oxidant gas discharge communication hole 28b is formed at the other short side of the first end plate 20a up to a predetermined depth (or to penetrate the plate). The knock pin fitting hole 64b has a circular opening shape, and an end portion of the knock pin 52b is fit thereto.

Similarly to the first end plate 20a, a knock pin fitting hole 64a is formed at one short side of the second end plate 20b, and a knock pin fitting hole 64b is formed at the other short side of the second end plate 20b.

As illustrated in FIG. 1, an oxidant gas inlet manifold 66a, a oxidant gas outlet manifold 66b, a fuel gas inlet manifold 68a, and a fuel gas outlet manifold 68b are provided on the first end plate 20a. The oxidant gas inlet manifold 66a and the oxidant gas outlet manifold 66b communicate with the oxidant gas supply communication hole 28a and the oxidant gas discharge communication hole 28b. The fuel gas inlet manifold 68a and the fuel gas outlet manifold 68b communicate with the fuel gas supply communication hole 30a and the fuel gas discharge communication hole 30b.

As illustrated in FIG. 2, a cooling medium inlet manifold 70a and a cooling medium outlet manifold 70b are provided on the second end plate 20b. The cooling medium inlet manifold 70a communicates with the pair of cooling medium supply communication holes 32a at the top and the bottom, and the cooling medium outlet manifold 70b communicates with the pair of cooling medium discharge communication holes 32b at the top and the bottom.

As illustrated in FIG. 1, both ends of a connection bar 72 is fixed by a screw 74 between respective sides of the first end plate 20a and the second end plate 20b, and a clamp load in the stacking direction (direction of the arrow A) is applied to the plurality of stacked power generation cells 12.

Hereinafter, a description will be given of an operation of the fuel cell stack 10 configured as described above.

First, as illustrated in FIG. 1, oxidant gas such as oxygen containing gas (for example, air) is supplied to the oxidant gas supply communication hole 28a from the oxidant gas inlet manifold 66a of the first end plate 20a. Fuel gas such as hydrogen-containing gas (for example, hydrogen gas) is supplied to the fuel gas supply communication hole 30a from the fuel gas inlet manifold 68a of the first end plate 20a.

Meanwhile, as illustrated in FIG. 2, in the second endplate 20b, a cooling medium such as pure water, ethylene glycol, oil, etc. is supplied from the cooling medium inlet manifold 70a to the pair of cooling medium supply communication holes 32a.

For this reason, as illustrated in FIG. 3, oxidant gas is introduced from the oxidant gas supply communication hole 28a to the oxidant gas passage 40 of the cathode separator 24. oxidant gas flows in the direction of the arrow B along the oxidant gas passage 40, and is supplied to the cathode electrode 36 of the electrolyte film/electrode structure 22.

Meanwhile, fuel gas is supplied from the fuel gas supply communication hole 30a to the fuel gas passage 42 of the anode separator 26. Fuel gas flows in the direction of the arrow B along the fuel gas passage 42, and is supplied to the anode electrode 38 of the electrolyte film/electrode structure 22.

Therefore, in the electrolyte film/electrode structure 22, oxidant gas supplied to the cathode electrode 36 and fuel gas supplied to the anode electrode 38 are consumed by an electrochemical reaction inside the electrode catalyst layer, and power generation is performed.

Subsequently, oxidant gas, a portion of which is consumed by being supplied to the cathode electrode 36 of the electrolyte film/electrode structure 22, is discharged in the direction of the arrow A along the oxidant gas discharge communication hole 28b. Meanwhile, fuel gas, a portion of which is consumed by being supplied to the anode electrode 38 of the electrolyte film/electrode structure 22, is discharged in the direction of the arrow A along the fuel gas discharge communication hole 30b. As illustrated in FIG. 1, oxidant gas is discharged from the oxidant gas outlet manifold 66b, and fuel gas is discharged from the fuel gas outlet manifold 68b.

In addition, as illustrated in FIG. 3, the cooling medium supplied to the cooling medium supply communication holes 32a at the top and the bottom is introduced to the cooling medium passage 44 between the cathode separator 24 and the anode separator 26 adjacent to each other. The cooling medium flows from the cooling medium supply communication holes 32a at the top and the bottom in a direction of approaching each other, that is, inward in the direction of the arrow C, and then moves in the direction of the arrow B to cool the electrolyte film/electrode structure 22. The cooling medium moves in a direction of being separated from each other outward in the direction of the arrow C, and then is discharged in the direction of the arrow A along the cooling medium discharge communication holes 32b at the top and the bottom.

As illustrated in FIG. 2, the cooling medium is discharged to an inside of the cooling medium outlet manifold 70b from the cooling medium discharge communication holes 32b at the top and the bottom. The cooling medium interflows inside the cooling medium outlet manifold 70b, and then is discharged to the outside.

In this case, in the present embodiment, as illustrated in FIG. 3, the first knock pin insertion holes 50a and 50b having circular opening shapes are formed in the cathode separator 24 and the anode separator 26. Meanwhile, as illustrated in FIG. 2 and FIG. 4, the second knock pin insertion holes 62a and 62b having ellipse opening shapes and elongated shapes in the long-side direction of the first insulating plate 18a are formed in the first insulating plate 18a.

The cathode separator 24, the anode separator 26, and the first insulating plate 18a are made of different materials. For example, the cathode separator 24 and the anode separator 26 include metal plates. For example, the first insulating plate 18a is made of a resin material and has a different linear expansion coefficient. For this reason, when the fuel cell stack 10 changes in temperature, a difference is generated between linear expansion of the cathode separator 24 and the anode separator 26 and linear expansion of the first insulating plate 18a.

Therefore, when the cathode separator 24 and the anode separator 26 contract or expand, the knock pins 52a and 52b move in a direction of a separator surface integrally with the cathode separator 24 and the anode separator 26. In particular, the cathode separator 24 and the anode separator 26 have rectangular shapes elongated in the direction of the arrow B, and the knock pins 52a and 52b easily move in the direction of the arrow B.

Herein, the second knock pin insertion holes 62a and 62b elongated in the long-side direction of the first insulating plate 18a are formed in the first insulating plate 18a, and the knock pins 52a and 52b may move in the direction of the arrow B inside the second knock pin insertion holes 62a and 62b.

In this way, stress applied to the second knock pin insertion holes 62a and 62b through the knock pins 52a and 52b due to a temperature change of the fuel cell stack 10 is favorably reduced. Further, stress applied to the knock pins 52a and 52b as a reaction force may be favorably reduced. For this reason, an effect that a desired positioning function may be ensured using a simple configuration is obtained. The second insulating plate 18b is configured similarly to the first insulating plate 18a, and may obtain a similar effect.

A fuel cell stack according to the present embodiment includes a power generation cell in which an electrolyte film/electrode structure provided with electrodes on both surfaces of an electrolyte film and a separator are stacked. An insulating plate and an endplate are arranged at both ends of a stacked body, which is obtained by stacking a plurality of power generation cells, in a stacking direction.

The separator and the insulating plate have rectangular shapes, and are positioned with respect to each other by knock pins integrally inserted thereto. In addition, first knock pin insertion holes, into which knock pins are inserted, having circular opening shapes are formed at short sides of the separator facing each other. Meanwhile, second knock pin insertion holes, into which knock pins are inserted, having ellipse opening shapes and having elongated shapes in a long-side direction of the insulating plate are formed at short sides of the insulating plate facing each other.

Further, in the fuel cell stack, the knock pins are preferably disposed by integrally penetrating between a pair of end plates.

Furthermore, in the fuel cell stack, two communication holes are preferably formed at each of the short sides of the separator, and each of the knock pins is preferably disposed between the two communication holes at each of the short sides.

According to the present embodiment, first knock pin insertion holes having circular opening shape are formed in a separator, and second knock pin insertion holes having ellipse opening shapes and having elongated shapes in a long-side direction of an insulating plate are formed in the insulating plate. For this reason, when the separator contracts or expands due to a temperature change of a fuel cell stack, knock pins may move inside the second knock pin insertion holes after the manner of a shape change of the separator.

Therefore, it is possible to favorably reduce stress applied to the second knock pin insertion hole through the knock pins due to a temperature change of the fuel cell stack, and favorably reduce stress applied as a reaction force to the knock pins. In this way, it is possible to ensure a desired positioning function using a simple configuration.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a power generation cell in which an electrolyte film/electrode structure provided with electrodes on both surfaces of an electrolyte film and a separator are stacked, an insulating plate and an end plate being arranged at both ends of a stacked body, which is obtained by stacking a plurality of power generation cells, in a stacking direction,
wherein said separator and said insulating plate have rectangular shapes, and are positioned with respect to each other by knock pins integrally inserted thereto,
first knock pin insertion holes having circular opening shapes are formed at short sides of said separator facing each other, said knock pins being inserted into said first knock pin insertion holes, and
second knock pin insertion holes having ellipse opening shapes and having elongated shapes in a long-side direction of the insulating plate are formed at short sides of the insulating plate facing each other, said knock pins being inserted into said second knock pin insertion holes.

2. The fuel cell stack according to claim 1,
wherein said knock pins are disposed by integrally penetrating between a pair of end plates.

3. The fuel cell stack according to claim 1,
wherein two communication holes are formed at each of the short sides of said separator, and
each of the knock pins is disposed between said two communication holes at each of the short sides.

4. A fuel cell stack comprising:
a stacked body having a first end and a second end opposite to the first end in a stacking direction, comprising:
power generation cells stacked in the stacking direction, each of the power generation cells comprising:
an electrolyte film/electrode structure including an electrolyte film sandwiched between a first electrode and a second electrode in the stacking direction; and
a separator stacked on the electrolyte film/electrode structure in the stacking direction and having an outer peripheral shape viewed in the stacking direction, the outer peripheral shape including a first short side, a second short side opposite to the first short side, and long sides opposite to each other and longer than the first and second short sides, the separator having a first knock pin insertion hole adjacent to the first side and a second knock pin insertion hole adjacent to the second side, each of the first knock pin insertion hole and the second knock pin insertion hole having a circular shape;
a first knock pin inserted into the first knock pin insertion hole;
a second knock pin inserted into the second knock pin insertion hole;
a first insulating plate provided at the first end, having a third knock pin insertion hole provided to correspond to the first knock pin insertion hole, and having a fourth knock pin insertion hole provided to correspond to the second knock pin insertion hole; and
a second insulating plate provided at the second end, having a fifth knock pin insertion hole provided to correspond to the first and third knock pin insertion holes, and having a sixth knock pin insertion hole provided to correspond to the second and fourth knock pin insertion holes, the first knock pin being inserted into the third and fifth knock pin insertion holes to be movable in the third and fifth knock pin insertion holes in a first direction orthogonal to a longitudinal axis of the first knock pin, the second knock pin being inserted into the fourth and sixth knock pin insertion holes to be movable in the fourth and sixth knock pin insertion holes in a second direction orthogonal to a longitudinal axis of the second knock pin.

5. The fuel cell stack according to claim 4, further comprising:
a first end plate provided at the first insulating plate in the stacking direction; and
a second end plate provided at the second insulating plate in the stacking direction.

6. The fuel cell stack according to claim 5,
wherein the first knock pin and the second knock pin are disposed by integrally penetrating between the first end plate and the second end plate.

7. The fuel cell stack according to claim 4, wherein
two communication holes are formed at each of the first short side and the second short side of the separator, and
each of the first knock pin and the second knock pin is disposed between the two communication holes at each of the first short side and the second short side.

8. The fuel cell stack according to claim 4,
wherein each of the third knock pin insertion hole, the fourth knock pin insertion hole, the fifth knock pin insertion hole, and the sixth knock pin insertion hole has an ellipse shape.

9. The fuel cell stack according to claim 4,
wherein each of the third knock pin insertion hole, the fourth knock pin insertion hole, the fifth knock pin insertion hole, and the sixth knock pin insertion hole has an elongated shape in a direction extending along the long sides.

10. The fuel cell stack according to claim 4,
wherein each of the separator, the first insulating plate, and the second insulating plate has a rectangular shape.

* * * * *